United States Patent [19]

Meir et al.

[11] 4,230,945
[45] Oct. 28, 1980

[54] DEVICE FOR DETECTING IONIZING RADIATION

[76] Inventors: Vladimir A. Meir, ulitsa Nalichnaya, 36, korpus 2, kv. 167; Alexei N. Zhukovsky, Serebristy bulvar, 24, korpus 4, kv. 374; Vladimir S. Ponomarev, ulitsa Stasovoi, 2, kv. 363, all of Leningrad; Vladimir G. Subbotin, ulitsa Vavilova 5, kv. 11, Dubna Moskovskoi oblasti; Jury P. Kharitonov, ulitsa 50-letia Komsomola, 19, kv. 44, Dubna Moskovskoi oblasti; Vladimir F. Kusniruk, ulitsa 50-letia Komsomola, 5, kv. 29, Dubna Moskovskoi oblasti; Lukyan I. Anatychuk, Sportivny proezd, 4, kv. 21; Anatoly P. Melnik, ulitsa Khudyakova, 1, kv. 50., both of Chernovtsy; Vladimir A. Skakodub, ulitsa Siltsiema, 5, kv. 76; Alexandr D. Sokolov, ulitsa Lenina, 159, kv. 1, both of Riga, all of U.S.S.R.

[21] Appl. No.: 899,515

[22] Filed: Apr. 24, 1978

[51] Int. Cl.² .................................................. G01T 1/22
[52] U.S. Cl. .................................... 250/370; 250/261
[58] Field of Search ............... 250/261, 352, 370, 371; 62/3, 264, 269, DIG. 9

[56] References Cited

U.S. PATENT DOCUMENTS

| 3,496,360 | 2/1970 | Dewan | 250/261 |
| 3,633,030 | 1/1972 | Antkiw et al. | 250/261 |
| 3,702,932 | 11/1972 | Tanner et al. | 250/261 X |

Primary Examiner—Davis L. Willis
Attorney, Agent, or Firm—Lackenbach, Lilling & Siegel

[57] ABSTRACT

The present invention relates to ionizing radiation sensors, and, more particularly, to semiconductor spectrometers with thermoelectric cooling, and can most advantageously be used in mineral raw material exploration and evaluation under field conditions. The spectrometer comprises a vacuum chamber with an entrance window for passing the radiation therethrough. The vacuum chamber accommodates a thermoelectric cooler formed by a set of Peltier elements. A heat conducting plate is mounted on the cold side of the thermoelectric cooler, and its hot side is provided with a radiator. Mounted on the heat conducting plate are sets of Peltier elements, integral with the thermoelectric cooler and independent of one another. The Peltier elements of these sets are stacked so as to develop the minimum temperature conditions on one set carrying a semiconductor detector and to provide the maximum refrigeration capacity conditions on the other set provided with the field-effect transistor mounted thereon.

15 Claims, 6 Drawing Figures

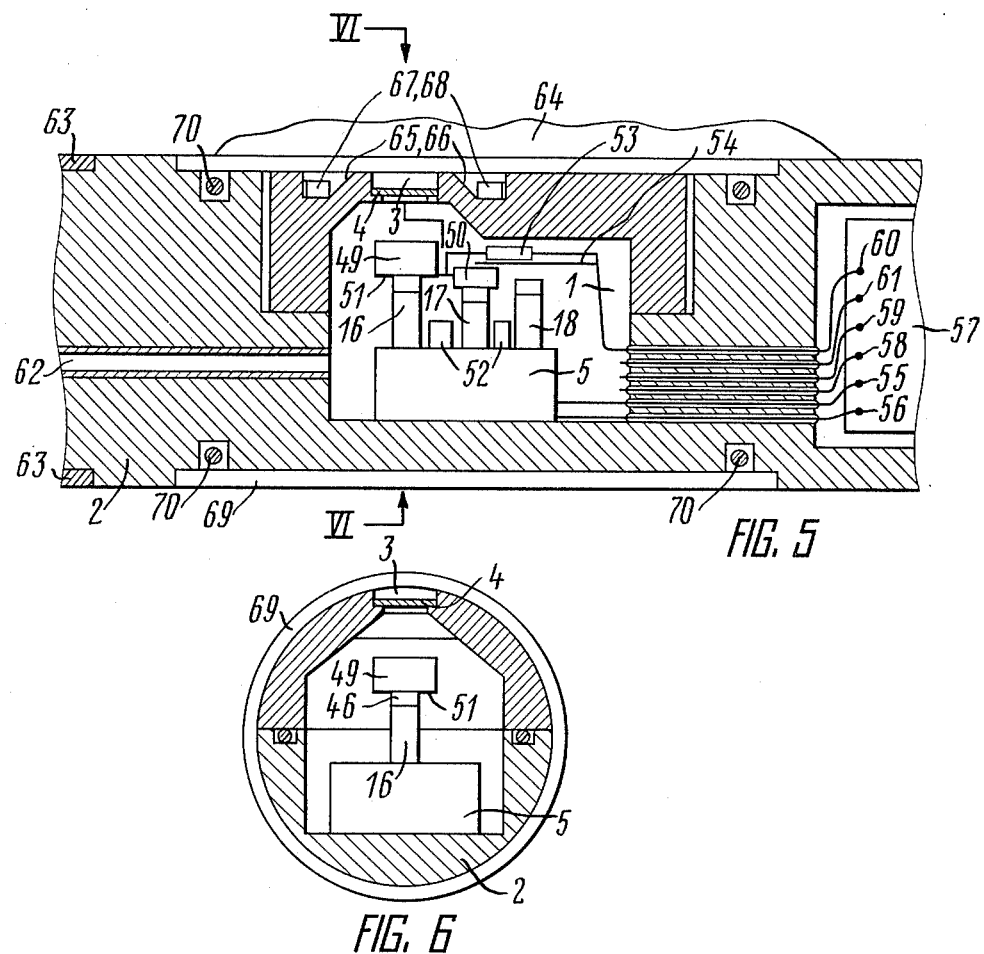

DEVICE FOR DETECTING IONIZING RADIATION

FIELD OF THE INVENTION

The present invention relates to analyzers using ionizing radiation, and more particularly to semiconductor spectrometers with thermoelectric cooling. The present invention can most advantageously be used in field searching and evaluation of mineral raw materials, and in process monitoring in the mining, chemical, and metallurgical industries, and in protection of the environment, radiological medical investigations, x-ray spectral and structural analysis, and can be applied to other fields of science and technology where ionizing radiation is used.

BACKGROUND OF THE INVENTION

It is known that in semiconductor spectrometers, a semiconductor detector and a field-effect transistor input stage of the preamplifier requires cooling to cryogenic temperature to lower the self-noises.

Known in the art are semiconductor spectrometers wherein the cooling is performed by solid or liquid cooling agents, such as solid methane or liquid nitrogen.

The systems used for storage and feeding the cooling agents are usually of a large size and must be continuously recharged, thus limiting the application to stationary laboratories. Such spectrometers are inconvenient for in-the-field research application even when cryostats adapted for shaft and well measurements are used. The quantity of the cooling agent stored is small and cannot be increased because of the restricted size of well devices.

Besides, when liquid cooling agents are used, the semiconductor spectrometer must be maintained in stringed orientation in order to avoid deterioration by contact between the cooling agent and the cold finger.

The overall dimensions of the spectrometer can be substantially decreased by using Peltier elements adapted for cooling the semiconductor detector and a field-effect transistor.

In this system, the semiconductor detector is fixed on a hollow heat conducting cylinder mounted on the cold junction of the Peltier element, and the field-effect transistor and a high-value resistor are arranged inside the cylinder.

The cooling of the detector system by Peltier elements has resulted in a more compact design of the semiconductor spectrometer. The external cooling is eliminated, and the semiconductor spectrometer has only an electric cable to provide greater flexibility and reliability in well applications.

Moreover, the semiconductor spectrometers are cooled by Peltier elements capable of orientation at any angle.

This detector system, however, fails to provide both an immediate heat contact of the semiconductor detector and the field-effect transistor with the cold junction of the Peltier element, and heat protection thereof against heat inputs produced by the case of the vacuum chamber, thus substantially increase their self-noises, and, in turn, result in loss of spectrometer performance.

Besides, the cooling of the cylinder results in additional energy consumption, thus increasing the overall power input.

Also known in the art are semiconductor spectrometers cooled by Peltier elements (cf. publication of the Institute of Nuclear Research in Poland).

Such a spectrometer comprises a vacuum chamber having an entrance window to pass radiation therethrough. In the interior of the chamber, there is arranged a thermoelectric cooler formed by a set of Peltier elements. Mounted on the cold side of the thermoelectric cooler is a heat conducting plate, and a semiconductor detector and a field-effect transistor is also fixed thereon. The hot side of the thermoelectric cooler is provided with a heat removing radiator.

The immediate heat contact of the semiconductor detector and of the field-effect transistor with the cold side of the thermoelectric cooler reduces their self-noises, thus enhancing the performance of the spectrometer as a whole.

In operation, the semiconductor detector requires maximum cooling but does not liberate heat, while the field-effect transistor requires less cooling but gives off heat, whereby a significant increase in power input of the thermoelectric cooler is essential to satisfy these contrary requirements.

The disadvantage of such a semiconductor spectrometer is the necessity of cooling the hot side of the the thermoelectric cooler by means of a refrigerant line to supply the additional external cooling agent, which, in turn, enlarges the size and weight of the spectrometer as a whole and fails to provide its self-sufficiency for field applications.

SUMMARY OF THE INVENTION

It is an object of the present invention to overcome the abovementioned disadvantages.

It is an object of the present invention to provide a semiconductor spectrometer having a thermoelectric cooler ensuring the optimum cooling of the semiconductor detector and of a field-effect transistor arranged thereon in the absence of the external refrigerant.

Another object of the present invention is to increase the detection efficiency and spectrometer performance, e.g. the accuracy of raw material and ore evaluation.

A further object of the present invention is to decrease the size of the semiconductor spectrometer.

Yet another object of the present invention is to decrease the weight of the semiconductor spectrometer.

Still a further object of the present invention is to minimize the power consumption of the semiconductor spectrometer.

Still another object of the present invention is to provide a semiconductor spectrometer suitable for well application in ore exploration and evaluation under field conditions.

In accordance with the invention, there is provided a spectrometer comprising a vacuum chamber having an entrance window to pass radiation therethrough and accommodating a thermoelectric cooler formed by a set of Peltier elements and arranged in the interior of the chamber. A semiconductor detector and a field-effect transistor is mounted on a heat conducting plate on the cold side of the thermoelectric cooler, its hot side being provided with a radiator to remove heat therefrom. Also sets of Peltier elements, integral with the cooler are fixed on its heat conducting plate, and the sets are stacked so as to develop the minimum temperature conditions on the first set carrying the semiconductor detector, and to develop the maximum refrigeration capacity conditions on the second set carrying the field-effect transistor.

Such a cooler design achieves optimum but different cooling conditions, by providing separate cooling areas for the semiconductor detector and the field-effect transistor, because the sets are mounted on the cooler independently of one another but are at the same time integral with the cooler, thus obtaining different temperatures on the cold sides of each set without changing the power consumption.

According to one embodiment of the invention, the Peltier elements of the set developing the minimum temperature conditions on its cold side form a two-stage thermoelectric battery having a heat conducting plate. The numbers of Peltier elements in adjacent stages is in the ratio from 4:1 to 7:1 in the temperature decrease direction. If the ratio between the numbers of Peltier elements in adjacent stages is less than 4:1, the desired temperature gradient is not obtained due to mismatching in the stages. If the ratio between the numbers of Peltier elements in adjacent stages is more than 7:1, the further lowering of temperature becomes negligible while the energy consumption of the spectrometer sharply increases.

The Peltier elements of the set building up the maximum refrigeration capacity conditions on its cold side form a one-stage thermoelectric battery, the number of Peltier elements in this stage and the number of Peltier elements in the stage adjacent the radiator being in a ratio from 1:10 to 1:40.

If the ratio is more than 1:40, the refrigerating capacity decreases and, hence, the temperature of its cold side increases, resulting in loss of spectrometer performances.

If the ratio is less than 1:10, the energy required for the desired refrigeration temperature increases.

According to another embodiment of the invention, the Peltier elements of the set developing the minimum temperature conditions on its cold side form a five-stage thermoelectric battery with heat conducting plates arranged between the stages, while the Peltier elements of the set producing the maximum refrigeration capacity conditions on its cold side form a four-stage thermoelectric battery also with heat conducting plates between the adjacent stages.

In this case, the numbers of Peltier elements in the adjacent stages of both sets are in a ratio less than 4:1 in the direction towards the semiconductor detector and the field-effect transistor, respectively. Such a construction enables a substantial decrease in the power consumption. Any further increase in the of number of stages, however, does not lead to a decrease in power consumption.

It is advisable to mount on the heat conducting plate of the thermoelectric cooler an additional third set of Peltier elements, integral with the cooler and stacked so as to provide the minimum temperature conditions.

Regardless of the embodiment of the proposed spectrometer, the Peltier elements in this third set are stacked similarly to the set where the semiconductor detector is mounted.

The Peltier elements of this additional unloaded set are stacked so as to develop on the cold side thereof the lowest temperature in the chamber with respect to the other surrounding elements such as the semiconductor detector, whereby the molecules of the residual gas will be adsorbed by its cold side rather than by the surface of the semiconductor detector.

Moreover, the proposed spectrometer or ionizing radiation detection device can be used to detect X-ray and gamma-ray environmental radiation in a well, the spectrometer being mounted within a well shell and the diameter of the radiator being equal to the outer diameter of the shell.

BRIEF DESCRIPTION OF THE DRAWINGS

The foregoing and other objects, features and advantages of the present invention will be apparent from the following description of the preferred embodiments of the invention and are illustrated in the accompanying drawings, wherein:

FIG. 5 is a schematic longitudinal sectional view of the spectrometer arranged within a well shell; and FIG. 6 is a sectional view taken along line VI—VI of FIG. 5.

DESCRIPTION OF THE PREFERRED EMBODIMENTS

Figure 1:
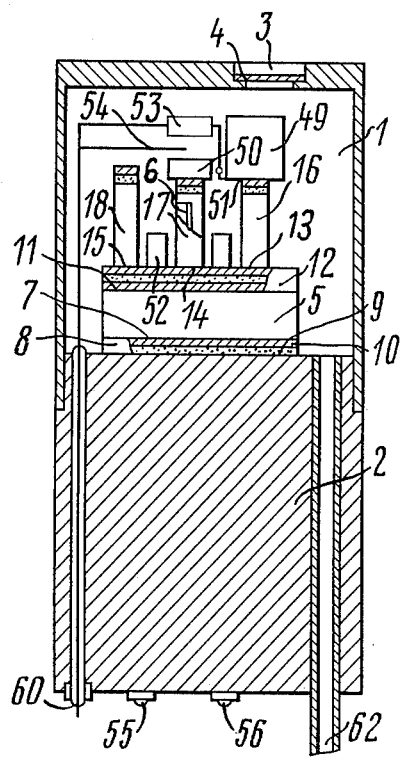
FIG. 1 is a schematic longitudinal sectional view of the spectrometer, of the invention.

The proposed spectrometer comprises a vacuum chamber 1 (FIG. 1), its base being formed by the metallic surface of a radiator 2 made e.g. of copper.

In order to decrease the parasitic heat inputs the inner and outer surfaces of the vacuum chamber 1 are polished, the inner surface is then covered with silver.

The vacuum chamber 1 is provided with an entrance window 3 to pass the ionizing radiation therethrough. The entrance window 3 is fitted with a beryllium layer 4.

Mounted on the radiator 2 inside the chamber 1 is a base set 5 of a thermoelectric cooler, stacked of Peltier elements 6, a hot side 7 of the base set 5 is in contact with the radiator 2.

The Peltier elements 6 may be formed by any conventional thermoelectric couple, e.g. made up of bismuth telluride and other semiconductor materials with the addition of selenium.

Located between the hot side 7 of the base set 5 and the radiator 2 is a heat conducting plate 8 consisting of a beryllium oxide heat junction 9 and a commutating plate 10 made of copper.

On a cold side 11 of the base set 5 there is arranged a heat conducting plate 12, analogous to the plate 8. Hot sides 13, 14, 15 of respective sets 16, 17, 18 of the Peltier elements 6 connected in series are in contact with the plate 12.

Figure 2:
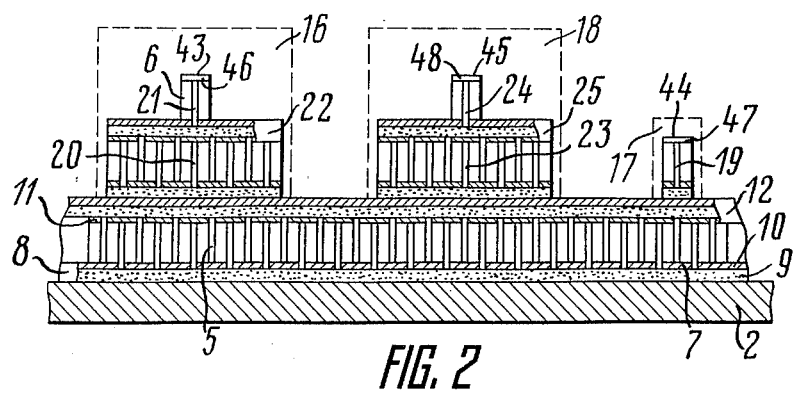
FIG. 2 is a schematic view of sets of Peltier elements.

According to one embodiment of the invention, the set 17 (FIG. 2) comprises one stage 19 consisting of two Peltier elements 6. The set 16 comprises two stages 20 and 21, with a heat conducting plate 22 arranged therebetween.

The set 18 includes two stages 23 and 24 separated by a heat conducting plate 25. The stages 20 and 23 each comprises ten Peltier elements 6 and the stages 21 and 24 each comprises two Peltier elements 6. In accordance with this embodiment of the invention, the base set 5 consists of eighty-six Peltier elements 6.

Figure 3:
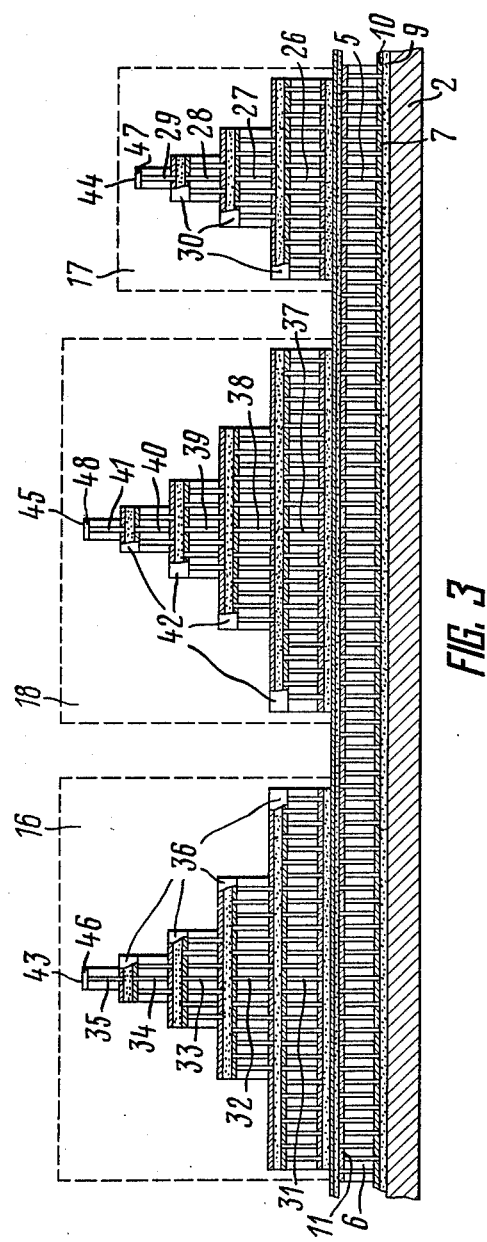
FIG. 3 is a schematic view of sets of Peltier elements, illustrating another embodiment of the invention.

According to another embodiment of the present invention the set 17 (FIG. 3) comprises four stages 26, 27, 28, 29, each including 16,8, 4, 2 Peltier elements 6, respectively. Heat conducting plates 30 are arranged between the adjacent stages 26, 27, 28, 29 of the set 17. The set 16 comprises five stages 31, 32, 33, 34, 35 each consisting of 32, 16, 8, 4, 2 Peltier elements 6, respectively. Between the adjacent stages 31, 32, 33, 34, 35 of the set 16 heat conducting plates 36 are located.

The set 18 includes five stages 37, 38, 39, 40, 41 each consisting of 32, 16, 8, 4, 2 Peltier elements 6, respectively. Heat conducting plates 42 are arranged between the adjacent stages 37, 38, 39, 40, 41. In accordance with this embodiment, the base set 5 comprises ninety-six Peltier elements 6.

Heat conducting plates 46, 47, 48 are mounted on cold sides 43, 44, 45 of the sets 16, 17, 18 respectively (FIG. 1).

A semiconductor detector 49 is fixed on the heat conducting plate 46. The semiconductor detector 49 can be fabricated of Si(Li), Ge(Li), Ga(Ar)CdTe, $HgJ_2$. High purity germanium can be used as well.

Mounted on the heat conducting plate 47 is a field-effect transistor 50. The semiconductor detector 49 and the field-effect transistor 50 are in immediate vicinity to decrease the parasitic capacity therebetween.

The field-effect transistor 50 is connected to a lower terminal 51 of the semiconductor detector 49 being in contact with the set 16. Arranged on the heat conducting plate 12 of the base set 5 is an adsorbing layer 52 to adsorb the residual gas particles from the interior of the vacuum chamber 1. The vacuum chamber 1 accommodates a feedback element 53 arranged therein and which is coupled to the terminal 51 of the semiconductor detector 49 and to the field-effect transistor 50.

In case a Schottky diode is used as the feedback element 53, it is cooled by the set 17. Furthermore, an optical feedback can be provided through the ceramic case of the field-effect transistor 50 when using a photodiode as the feedback element 53.

Adjacent to the field-effect transistor 50 is a feedback capacitance 54 formed by a metallic probe.

Figure 4:
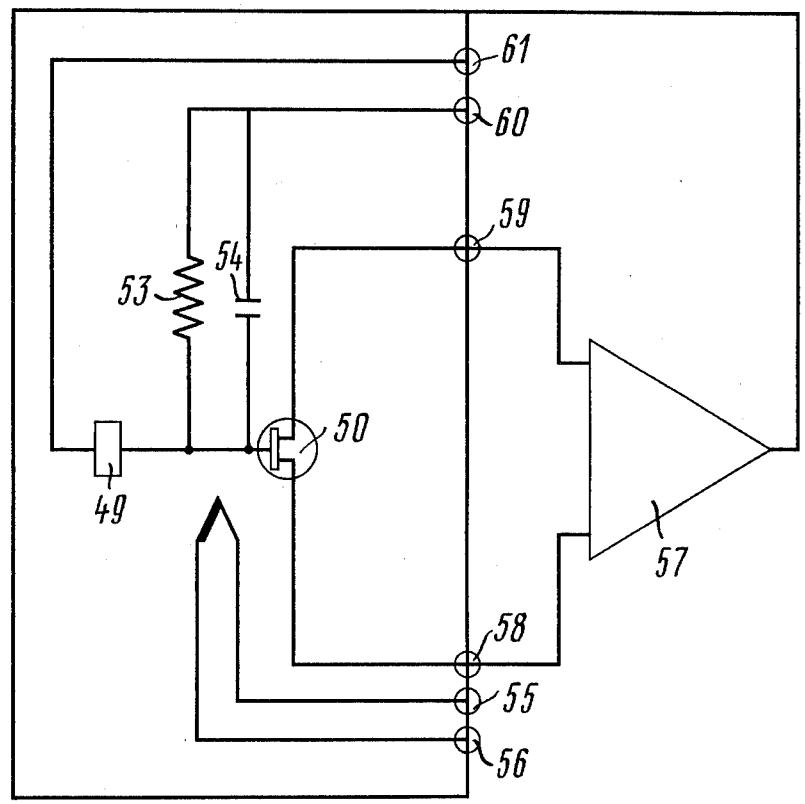
FIG. 4 is an electric diagram of the spectrometer, according to the invention.

The power is supplied to the base set 5 via sealed electric leads 55 and 56 (FIG. 4) passing through the radiator 2.

The field-effect transistor 50 is powered from sealed electric leads 58, 59 arranged in the radiator 2. The amplified signal from the field-effect transistor 50 is applied to a preamplifier 57 via the same leads 58, 59.

The feedback signal from the output of the preamplifier 57 is delivered to the field-effect transistor 50 via a sealed lead 60 in the radiator 2.

The semiconductor detector 49 is powered via a sealed electric lead 61 arranged in the radiator 2.

The sealed electric leads 55, 56, 58, 59, 60, 61 are fabricated of low heat conduction material, e.g., of constantan, to decrease the heat inputs from the outside.

A duct 62 is provided in the radiator 2 (FIG. 1) to pump the residual gases out of the chamber 1.

In well application the vacuum chamber 1 and the preamplifier 57 are mounted within a case 63 of a commercially available well shell (FIGS. 5,6). The observed wall 64 of the well is irradiated by the radio-izotope sources 67, 68 fitted in collimators 65, 66 outside the case of the vacuum chamber at the side of the entrance window 3.

The vacuum chamber 1 mounted within the case 63 of the well shell is hermetically sealed with a berillium cap 69 withstanding the pressure as high as 400 atm and by means of rubber rings 70. The diameter of the radiator 2 should by preferably equal to the diameter of the case 63 of the well shell, so as to considerably improve the heat exchange between the radiator 2 and the ambient medium, the latter being mud solution, water or the wall 64 itself of the shell.

OPERATION

For the purpose of illustration the operation of the spectrometer or ionizing radiation detection device will be described in its well application for raw material exploration and evaluation.

Prior to lowering the spectrometer or device into the well, the gases are pumped out from the chamber 1 (FIG. 5) through the duct 62, thermal degasification being performed from time to time, then the duct is cut off and the spectrometer is hermetically sealed with the rubber rings 70 and the berillium cap 69. Then the radiator 2 is mounted on the case 63 of the well shell and the assembly is lowered into the well. The wall 64 of the well is observed while the shell is being lifted to ensure its smooth movement and, in turn, the higher accuracy of the x-ray analysis.

The supply voltage is fed to the base set 5 of the thermoelectric cooler via the sealed leads 55, 56.

The described well type spectrometer or device operates at 5 V and 4 A. The pulsation must not exceed 1 millivolt effective.

On applying voltage, the Peltier elements 6 connected in series in the base set 5 and in each stage of the sets 16, 17, 18 and hooked into the electric circuit by means of the commutating plates, the temperature difference is produced, the hot side of the preceding stage being cooled by the cold side of the subsequent stage.

In operation, the heat is removed outside via the radiator 2 from the hot side 7 of the base set 5 to the water, mud solution or to the wall 64 itself contacting with the radiator 2.

One-two minutes after the supply voltage is switched on, all the elements of the thermoelectric cooler come to dynamic heat equilibrium, whereby the temperature on the cold side 45 of the set 18 achieves its minimum value, thus keeping the surface of the semiconductor detector 49 mounted on the cold side 43 of the set 16 from cryosorbtion of molecules of residual gases presenting in the vacuum chamber 1. At the same time the cooled absorbent 52 starts to absorb the residual gases liberated inside the chamber 1 by the elements forming the spectrometer, during its operation, this resulting in decrease of heat inputs coming from the walls of the chamber to the semiconductor detector 49, to the field-effect transistor 50 and to the sets 16, 17, 18 of the thermoelectric cooler.

Three-four minutes after the supply voltage is switched on, the temperature of the cold sides 43, 44 of the sets 16, 17, respectively and hence, of the semiconductor detector 49 and the field-effect transistor 50 mounted thereon, achieves its operative conditions, and the bias voltage is applied to said semiconductor detector and field-effect transistor from an external source (not shown). A stabilizer (not shown) is provided to protect the field-effect transistor against voltage changes.

The quanta of the characteristic x-ray and gamma-ray radiation exited in the wall 64 of the well by primary collimated (collimators 65, 66) radiation of the radio-izotope sources 67, 68 penetrates through the berillium cap 70 and the berillium entrance window 3 and falls on to the semiconductor detector 49 and, being absorbed by it, creates electron-hole pairs whose charge is proportional to the energy of the absorbed quantum. The drift of the charge carriers under the influence of the electric field of the semiconductor detector 49 induces an electric pulse in an outer circuit of the semiconductor detector 49, said circuit consisting of feedback elements 53 and a feedback capacity 54. This electric pulse is fed to the field-effect transistor 50 where it is amplified, and via the sealed lead 60 is applied to the preamplifier 57 and further to the ground analyzer (not shown).

Thus, according to the present invention, separate coolers are provided for the semiconductor 49, its cooler being formed by the three-stage set 16, and for the field-effect transistor 50 whose cooler is formed by the one-stage set 17, whereby the power consumption is decreased to 20 W and, consequently the size of the spectrometer or device is reduced to 40 mm in diameter and 80 mm in height and the weight to 0.3 kg. The further decrease in power consumption to $7 \geqq 5$ W is possible by utilizing a five-stage set 16 for cooling the semiconductor detector 49 and a four-stage set 17 for the field-effect transistor 50 while retaining the same size and negligible increase in device weight.

A low power input of the spectrometer or device permits the use of radiators of simplified design, requiring no external cooling agents, e.g. water, thus providing its greater flexibility in application.

The abovementioned features of the invention, i.e. low power consumption, the elimination of additional cooling means, small size and weight of the spectrometer or device enable its successful geophysical nuclear application in field conductions and, in particular, its well application within a well shell to carry out X-ray analysis of a well.

While the invention has been particularly shown and described with reference to the preferred embodiments thereof it will be understood by those skilled in the art that the foregoing and other various changes in form and details may be made therein without departing from the scope of the invention.

What is claimed is:

1. A spectrometer for detecting ionizing radiation comprising:
   a vacuum chamber having an entrance window to pass the radiation therethrough;
   a thermoelectric cooler formed by a set of Peltier elements, said thermoelectric cooler having a hot side and a cold side and being arranged within said vacuum chamber;
   a heat conducting plate mounted on said cold side of said thermoelectric cooler;
   a radiator mounted on said hot side of said thermoelectric cooler to remove heat therefrom;
   a first set of Peltier elements, having a hot side and a cold side and being integral with said thermoelectric cooler, said hot side of said first set being in contact with said heat conducting plate, the Peltier elements of this first set being stacked so as to develop the minimum temperature conditions on said cold side of said first set;
   a semiconductor detector mounted on said cold side of said first set of Peltier elements;
   a second set of Peltier elements, having a hot side and a cold side and being integral with said thermoelectric cooler, said hot side of said second set being in contact with said heat conducting plate and the Peltier elements of this second set being stacked so as to develop the maximum refrigeration capacity conditions on said cold side of said second set;
   a field-effect transistor mounted on said cold side of said second set of Peltier elements.

2. A spectrometer according to claim 1, wherein the Peltier elements of said first set developing the minimum temperature conditions on its cold side form a thermoelectric battery comprising at least two stages and a heat conducting plate arranged between the adjacent stages.

3. A spectrometer according to claim 2, wherein the numbers of Peltier elements in the adjacent stages of the first set developing the minimum temperature conditions on its cold side are in ratio from 4:1 to 7:1 in the temperature decrease direction.

4. A spectrometer according to claim 1, wherein the Peltier elements of said first set developing the minimum temperature conditions on its cold side form a thermoelectric battery comprising no more than five stages with heat conducting plates arranged between the adjacent stages.

5. A spectrometer according to claim 4, wherein the numbers of Peltier elements in the adjacent stages of said first set developing the minimum temperature conditions on its cold side are in ratio less than 4:1 in the temperature decrease direction.

6. A spectrometer according to claim 1, wherein a third set of Peltier elements is provided, said third set being integral with said thermoelectric cooler and having a hot side and a cold side, said hot side being in contact with said heat conducting plate, the Peltier elements of said third set being stacked so as to develop the minimum temperature conditions on said cold side of said third set.

7. A spectrometer for detecting ionizing radiation comprising a vacuum chamber having an entrance window to pass the radiation therethrough; a thermoelectric cooler formed by a set of Peltier elements, said thermoelectric cooler having a hot side and a cold side and being arranged within said vacuum chamber; a heat conducting plate mounted on said cold side of said thermoelectric cooler a radiator mounted on said hot side of said thermoelectric cooler; a first set of Peltier elements forming a thermoelectric battery which comprises at least two stages with a heat conducting plate therebetween, said first set being integral with said thermoelectric cooler and arranged on said heat conducting plate, thus developing the minimum temperature conditions on said cold side of said first set; a semiconductor detector mounted on said cold side of said first set of Peltier elements; a second set of Peltier elements, having a hot side and a cold side and being integral with said thermoelectric cooler, said hot side of said second set being in contact with said heat conducting plate, the Peltier elements of said second set being stacked so as to develop the maximum refrigeration capacity conditions on said cold side of said second set; a field-effect transistor mounted on said cold side of said second set, the Peltier elements of said second set being stacked so as to develop the maximum refrigeration capacity conditions on its cold side and to form a one-stage thermoelectric battery.

8. A spectrometer according to claim 7, wherein the number of the Peltier elements in the stage of said second set developing the maximum refrigeration capacity conditions on its cold side is in ratio from 1:10 to 1:40 to the number of Peltier elements in a set adjacent to said radiator.

9. A spectrometer for detecting ionizing radiation comprising a vacuum chamber having an entrance window to pass the radiation therethrough; a thermoelectric cooler formed by a set of Peltier elements, said thermoelectric cooler having a hot side and a cold side and being arranged within said vacuum chamber; a heat conducting plate mounted on said cold side of said thermoelectric cooler; a radiator mounted on said hot side of said thermoelectric cooler to remove heat therefrom; a first set of Peltier elements forming a thermoelectric battery comprising no more than five stages with heat conducting plates arranged between the adjacent stages, said first set being integral with said thermoelectric cooler and arranged on said heat conducting plate and developing the minimum temperature conditions on said cold side of said first set; a semiconductor detector mounted on said cold side of said first set; a second set of Peltier elements, having a hot side and a cold side, said second set being integral with said thermoelectric cooler, said hot side of said second set being in contact with said heat conducting plate, the Peltier elements of said second set being stacked so as to develop the maximum refrigeration capacity conditions on said cold side of said second set; a field-effect transistor mounted on said cold side of said second set, the Peltier elements of said second set developing the maximum refrigeration capacity conditions on its cold side forming a thermoelectric battery comprising no more than four stages with heat conducting plates arranged between the adjacent stages.

10. A spectrometer according to claim 9, wherein the numbers of Peltier elements in the adjacent stages of said second set developing the maximum refrigeration capacity conditions on its cold side are in ratio less than 4:1 in the direction towards said field-effect transistor.

11. A spectrometer for detecting ionizing radiation comprising a vacuum chamber having an entrance window to pass the radiation therethrough; a thermoelectric cooler formed by a set of Peltier elements, said thermoelectric cooler having a hot side and a cold side and being arranged within said vacuum chamber; a heat conducting plate mounted on said cold side of said thermoelectric cooler; a radiator mounted on said hot side of said thermoelectric cooler to remove heat therefrom; a first set of Peltier elements, mounted on said heat conducting plate and being integral with said thermoelectric cooler, said first set forming a thermoelectric battery comprising at least two stages with a heat conducting plate arranged between the adjacent stages, said first set developing the minimum temperature conditions on its cold side; a semiconductor detector mounted on said cold side of said first set of Peltier elements; a second set of Peltier elements, mounted on said heat conducting plate and being integral with said thermoelectric cooler, said second set forming a one-stage battery and developing the maximum refrigeration capacity conditions on the cold side of said second set; a field-effect transistor mounted on the cold side of said second set; a third set of Peltier elements, integral with said thermoelectric cooler and having a hot side and a cold side, said hot side being in contact with said heat conducting plate, the Peltier elements of said third set being stacked so as to develop the minimum temperature conditions on its cold side and to form a thermoelectric battery comprising at least two stages with a heat conducting plate arranged therebetween.

12. A spectrometer according to claim 11, wherein the number of Peltier elements in adjacent stages of said third set developing the minimum temperature conditions on its cold side are in ratio from 4:1 to 7:1 in the temperature decrease direction.

13. A spectrometer for detecting ionizing radiation comprising a vacuum chamber having an entrance window to pass the radiation therethrough; a thermoelectric cooler formed by a set of Peltier elements, having a hot side and a cold side and arranged within said vacuum chamber; a heat conducting plate mounted on said cold side of said thermoelectric cooler; a radiator mounted on said hot side of said thermoelectric cooler to remove heat therefrom; a first set of Peltier elements, integral with said thermoelectric cooler and mounted on said heat conducting plate; said first set forming a thermoelectric battery comprising no more than five stages with heat conducting plates arranged between the adjacent stages, said first set developing the minimum temperature conditions on its cold side; a semiconductor detector mounted on said cold side of said first set of Peltier elements; a second set of Peltier elements, integral with said thermoelectric cooler and mounted on said heat conducting plate, said second set forming a thermoelectric battery comprising not more than four stages with heat conducting plates arranged between the adjacent stages, said second set developing the maximum refrigeration capacity conditions on its cold side; a field-effect transistor mounted on said cold side of said second set; a third set of Peltier elements integral with said thermoelectric cooler and having a hot side and a cold side, said cold side being in contact with said heat conducting plate, the Peltier elements of said third set being stacked so as to develop the minimum temperature conditions on its cold side and to form a thermoelectric battery comprising no more than five stages with heat conducting plates arranged between the adjacent stages.

14. A spectrometer according to claim 13, wherein the numbers of Peltier elements in the adjacent stages of said third set developing the minimum temperature conditions on its cold side are in ratio less than 4:1 in the temperature decrease direction.

15. A spectrometer according to any of claims 1 and 7–14 wherein, the spectrometer is accommodated within a well shell, and the diameter of said radiator being equal to the outer diameter of said shell.

* * * * *